(12) United States Patent
Matucheski

(10) Patent No.: US 9,033,108 B2
(45) Date of Patent: May 19, 2015

(54) LUBRICANT FLOW SUPPRESSOR

(75) Inventor: Joseph V. Matucheski, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1699 days.

(21) Appl. No.: 12/002,258

(22) Filed: Dec. 14, 2007

(65) Prior Publication Data

US 2008/0245614 A1 Oct. 9, 2008

Related U.S. Application Data

(60) Provisional application No. 60/876,773, filed on Dec. 22, 2006.

(51) Int. Cl.
*F16N 39/00* (2006.01)
*F16H 57/04* (2010.01)
*F16N 31/00* (2006.01)

(52) U.S. Cl.
CPC ............ *F16N 31/00* (2013.01); *F16H 57/0423* (2013.01); *F16H 57/0436* (2013.01); *F16H 57/0456* (2013.01); *F16H 57/0495* (2013.01)

(58) Field of Classification Search
CPC ........... F16N 39/00; F16N 39/06; F16N 7/40; F01M 1/02; F16C 33/10
USPC ................................. 184/612, 6.21
See application file for complete search history.

(56) References Cited

U.S. PATENT DOCUMENTS

| 4,013,046 | A | * | 3/1977 | Kemp | 123/229 |
| 4,616,610 | A | * | 10/1986 | Ishida | 123/196 A |
| 5,316,665 | A | * | 5/1994 | Hart | 210/85 |
| 5,407,150 | A | * | 4/1995 | Sadleir | 244/12.4 |
| 6,045,692 | A | * | 4/2000 | Bilski et al. | 210/198.1 |

* cited by examiner

*Primary Examiner* — Henry Liu
(74) *Attorney, Agent, or Firm* — Krieg DeVault LLP

(57) ABSTRACT

A lubricant flow suppressor positioned proximate a rotating component for receiving ejected lubricant therefrom and reducing the kinetic energy of the ejected lubricant. The suppressor includes at least two perforated walls with a lubricant flow path formed therebetween.

16 Claims, 5 Drawing Sheets

LUBRICANT FLOW SUPPRESSOR

CROSS REFERENCE

The present application claims the benefit of U.S. Patent Application No. 60/876,773, filed Dec. 22, 2006, which is incorporated herein by reference.

GOVERNMENT RIGHTS

The present invention was made with U.S. Government support under contract no. N00019-02-C-3003 awarded by the United States Navy. The U.S. Government has certain rights herein.

FIELD OF THE INVENTION

The present invention relates to a lubrication system, and more particularly to a lubricant suppressor for retarding kinetic flow energy of lubricant that has been ejected from a lubricated component.

BACKGROUND

High-speed machines with lubrication systems typically have a drain sump for receiving lubricant after the lubricant has been ejected from a rotating component. Some systems have a scavenge pump to move the lubricant from the drain sump to a supply sump from which a supply pump can supply pressurized lubricant back to the component. Alternatively, the drain sump and supply sump can be combined and the scavenge pump can be eliminated. If the lubricant fails to move to the drain sump quickly enough due to high momentum flow away from the component and/or windage forces caused by high speed rotating components, the supply sump can run low on lubricant and thus starve the lubricated component from necessary lubricant. One way to solve this problem is to design lubrication systems with a large lubricant reservoir, but the drawback with such designs is increased weight and space claim penalties associated therewith.

It would be advantageous to design lubrication systems that minimize total system size or space claim in machines such as engines, motors, turbo-machines, superchargers, transmissions and the like. The present invention provides novel and non-obvious additions to the technology associated with lubrication systems.

SUMMARY

One aspect of the present invention discloses a lubrication system having at least one lubricant reservoir with a supply of lubricant. At least one pump supplies lubricant from the reservoir to a rotating component, and a lubricant flow suppressor having at least two perforated walls for receiving and dissipating energy of ejected lubricant from the rotating component.

In another aspect of the present invention, an apparatus includes at least one lubricant reservoir for holding a quantity of lubricant. At least one lubricant pump transfers lubricant from the lubricant reservoir to at least one rotating component. A lubricant flow suppressor is positioned proximate the rotating component for receiving ejected lubricant therefrom and changing the flow velocity of the ejected lubricant.

In another aspect of the present invention, a lubricant flow suppressor includes a first perforated wall having at least one through aperture for permitting ejected lubricant to flow therethrough and reduce kinetic energy of the lubricant and a second perforated wall having at least one through aperture for permitting ejected fluid to flow therethrough and cause further reduction of kinetic energy before the ejected lubricant traverses to a lubricant drain sump. The lubricant flow suppressor can further include a solid wall positioned downstream of the first perforated wall for deflecting the ejected lubricant.

In another aspect of the present invention a method provides for controlling lubricant ejected from a rotating component including directing the ejected lubricant through a first perforated wall of a lubricant suppressor to change ejected lubricant flow velocity; and directing the ejected lubricant through a second perforated wall to further change the velocity of ejected lubricant.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
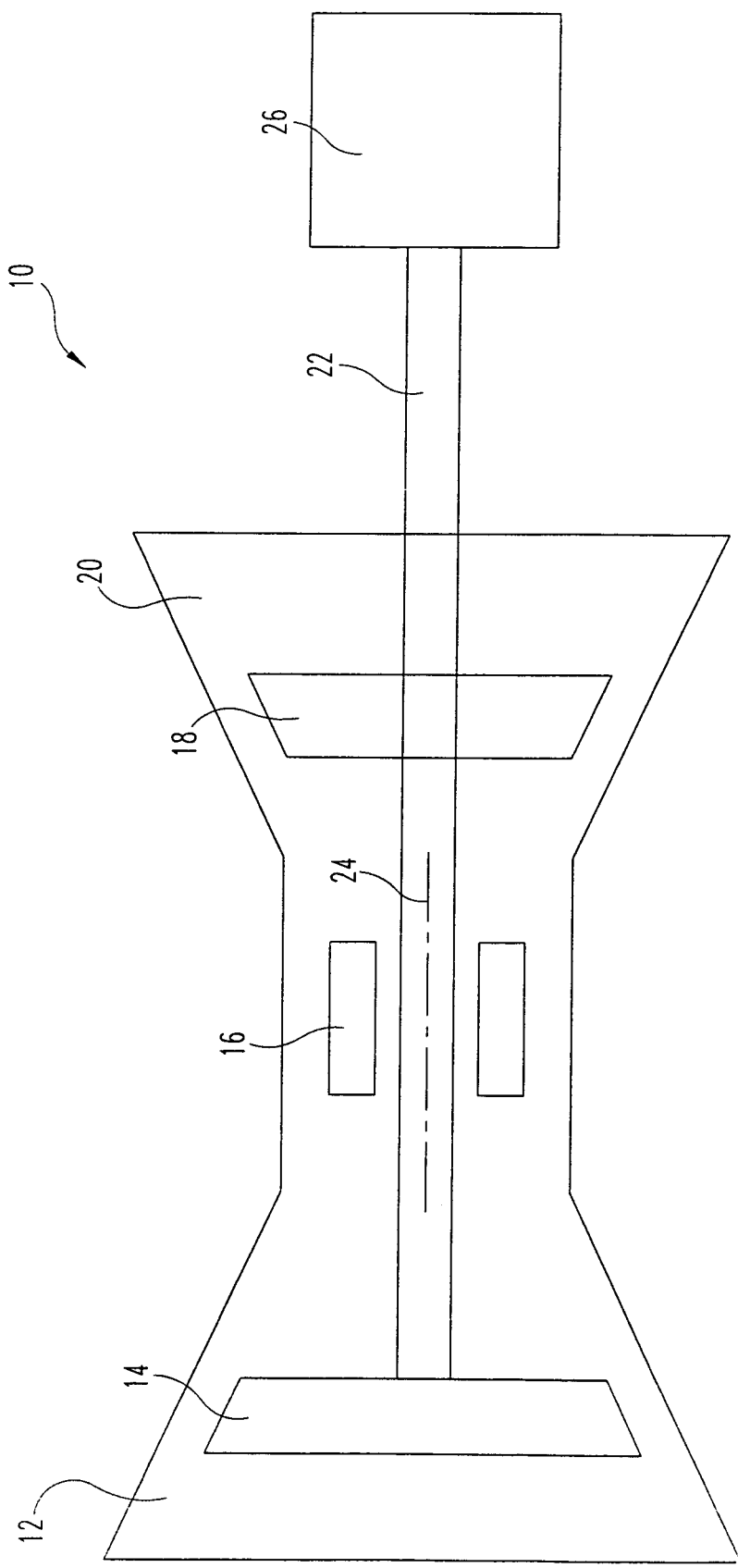
FIG. 1 is a schematic view of a gas turbine engine.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention has application to gas turbine engines and particular application to a gear train for a lift fan engine, however the teachings herein will benefit any apparatus having lubricated rotating machinery. Such machines include, but are not limited to gear boxes, transmissions, aircraft, watercraft, land based vehicles, movable and stationary machines reciprocating engines, motors, turbo machines, superchargers and the like.

Referring to FIG. 1, a schematic view of a gas turbine engine 10 is depicted. While the gas turbine engine is illustrated with one spool (i.e. one shaft connecting a turbine and a compressor), it should be understood that the present invention is not limited to any particular engine design or configuration and as such may be used in multi spool engines of the aero or power generation type. The gas turbine engine 10 will be described generally, however significant details regarding general gas turbine engines will not be presented herein as it is believed that the theory of operation and general parameters of gas turbine engines are well known to those of ordinary skill in the art.

The gas turbine engine 10 includes an inlet section 12, a compressor section 14, a combustor section 16, a turbine section 18, and an exhaust section 20. In operation, air is drawn in through the inlet 12 and compressed to a high pressure relative to ambient pressure in the compressor section 14. The air is mixed with fuel in the combustor section 16 wherein the fuel/air mixture burns and produces a high temperature and pressure working fluid from which the turbine section 18 extracts power. The turbine section 18 is mechanically coupled to the compressor section 14 via a shaft 22. The shaft 22 rotates about a centerline axis 24 that extends axially along the longitudinal axis of the engine 10, such that as the turbine section 18 rotates due to the forces generated by the high pressure working fluid, the compressor section 14 is rotatingly driven by the turbine section 18 to produce compressed air. A portion of the power extracted from the turbine section 18 can be utilized to drive a secondary device 26, such as a transmission, lift fan device, electrical generator, gas compressor or pump and the like. Alternatively, the gas turbine engine 10 can be of the aero type to produce thrust or shaft power for fixed wing aircraft or rotorcraft, respectively. Thrust producing engines produce high velocity mass flow through the exhaust section 20 and do not drive a secondary device 26.

Figure 2:
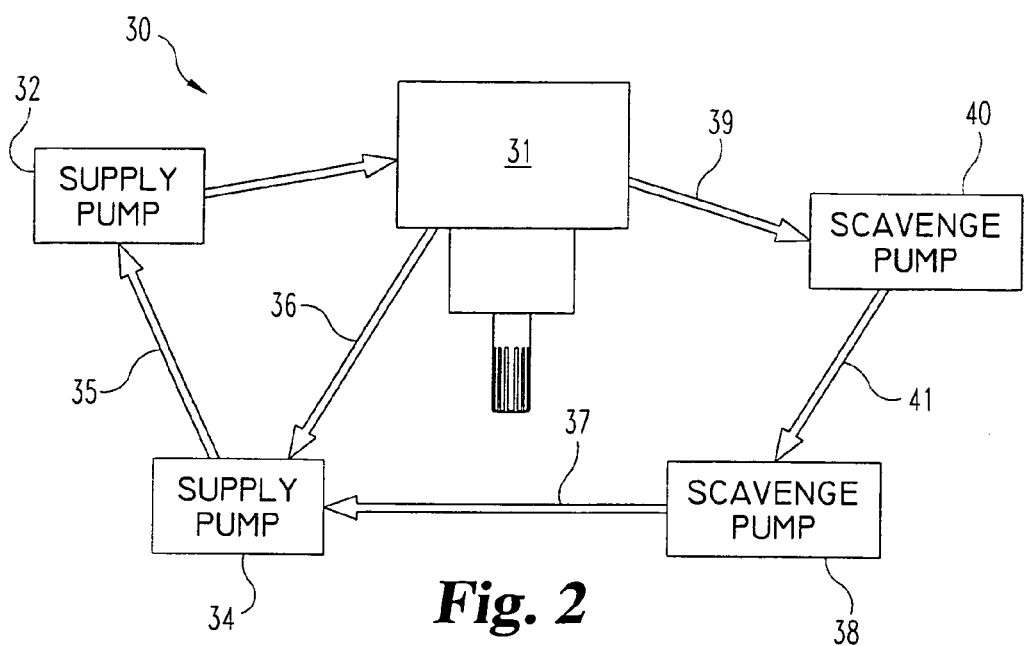
FIG. 2 is schematic view of a lubrication system.

Referring to FIG. 2, a schematic representation of a lubrication system 30 is shown. The lubrication system 30 can include an apparatus 31 having various forms of rotating machinery such as gears, bearings, and shafts (not shown) that require lubrication. Machines with rotating components require an adequate supply of lubrication to prevent/minimize wear caused by friction and premature failure of the components within the machine. In order to assure that an adequate supply of lubricant can be delivered to the rotating components (not illustrated), a supply pump 32 must continuously draw the lubricant from a supply sump 34 through a supply line 35. The supply sump 34 receives lubricant from a gravity feed return line 36 and/or a scavenge return line 37 from a scavenge pump 38. If a scavenge pump 38 is employed in the lubrication system, a scavenge sump 40 may also be utilized as a supply for the scavenge pump 38. The scavenge sump 40 receives lubricant from the apparatus 31 through a scavenge drain line 39 and delivers the lubricant to the scavenge pump 38 via a scavenge pump supply line 41.

Figure 3:
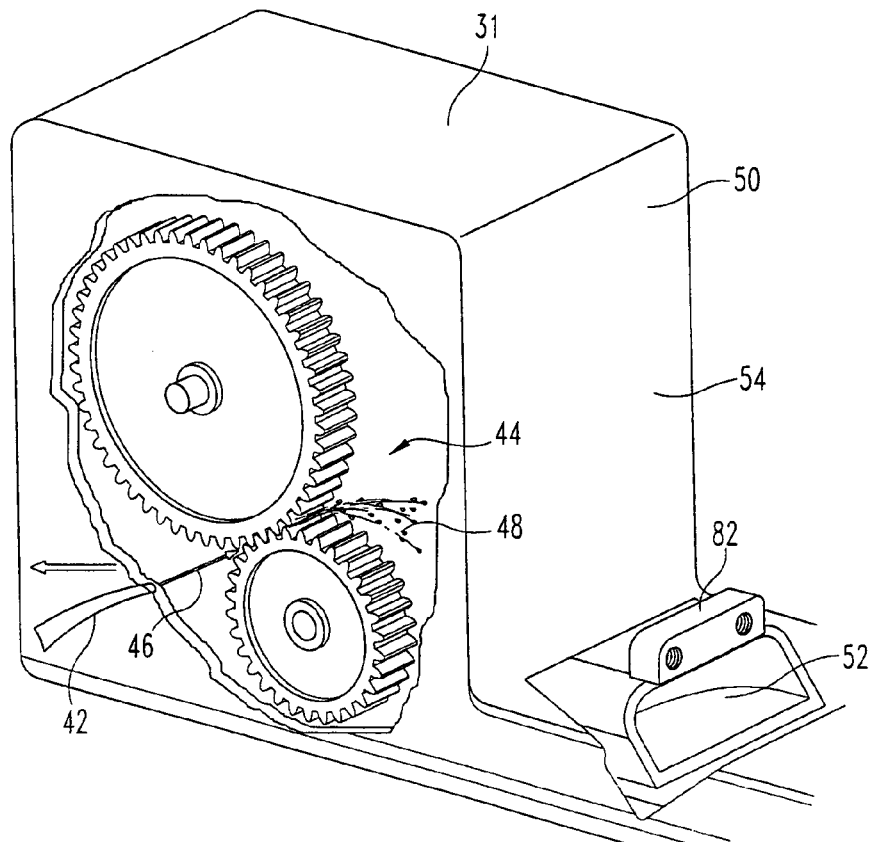
FIG. 3 is perspective view an apparatus partially cutaway to show lubrication of rotating components.

Referring now to FIG. 3 there is shown a perspective view of apparatus 31 partially cut-away to show a lubrication nozzle 42 feeding lubricant to a pair of gears 44. It should be understood that while a coupled gear set is illustrated in this embodiment, any rotating component can advantageously utilize the teachings of the present invention. An inlet stream of lubricant as illustrated by arrow 46 can be delivered by the lubrication nozzle 42 to the rotating gears 44 which impart energy momentum to the ejected lubricant 48 exiting from the gears. In one form the lubrication nozzle 42 delivers the inlet stream of lubricant to high speed rotating gears 44 which impact high energy momentum to the ejected lubricant 48 exiting from the gears. The high speed of the ejected lubricant 48 causes a time delay in lubricant being transported to one or more sump reservoirs 34 and/or 40. In addition to the high momentum achieved by contact with the high speed rotating components, the ejected lubricant 48 can also become entrained in high speed airflow sometimes called windage. Windage is a term of art that refers to relative high speed air flow or fluid flow caused by the high rotational speeds of components that are enclosed by a housing or the like. The windage can set up in stable flow patterns or can alternatively form unsteady eddies or vortices. Entrained lubricant tends to follow the airflow which increases the time it takes for the lubricant to return to either of sump reservoir(s) 34 and/or 40. The high velocity of the ejected lubricant can actually cause or add energy to windage in some systems. The apparatus 31 includes a housing 50 having at least one lubricant outlet port 52 formed in a wall 54 of the housing 50. The outlet port 52 is positioned to permit the ejected lubricant 48 to exit therethrough.

Figure 4:
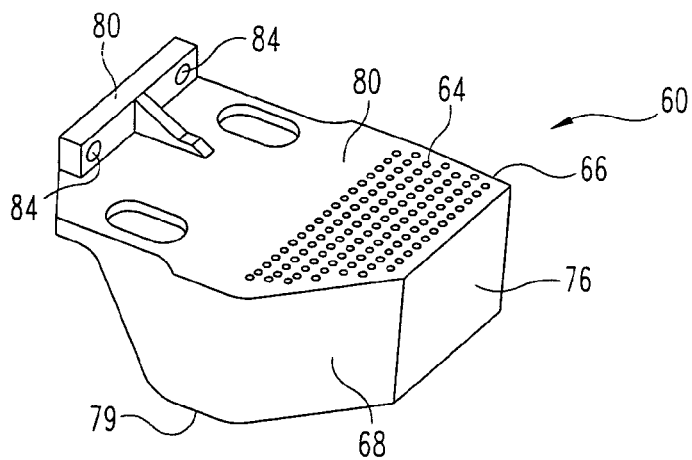
FIG. 4 is a top perspective view of one form of a lubricant flow suppressor.
Figure 5:
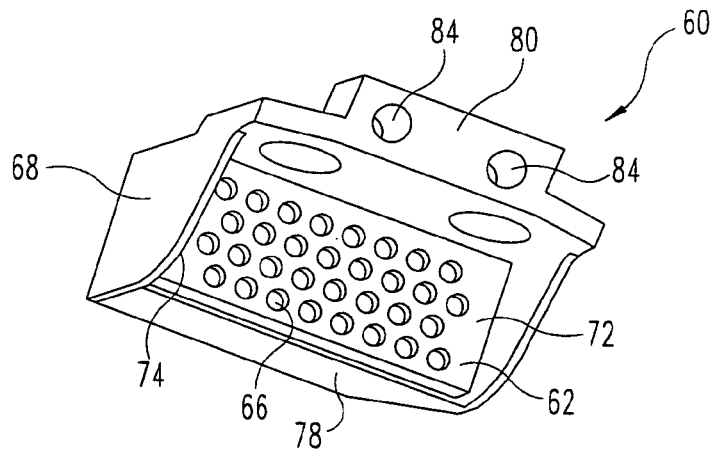
FIG. 5 is a side perspective view of the lubricant flow suppressor of FIG. 4.

Referring now to FIGS. 4 and 5, perspective views of one form of a lubricant flow suppressor 60 are illustrated. Lubricant flow suppressor 60 is operable for reducing the kinetic energy or velocity of the ejected lubricant 48 flowing through the outlet port 52 and facilitating rapid return thereof to the supply sump 34. The lubricant flow suppressor 60 can be positioned adjacent the housing 50 proximate the exit port 52. The lubricant flow suppressor 60 can be a separate piece connected to the housing 50 via mechanical attachment means such as mechanical fasteners, welding, brazing and the like. In which case the lubricant flow suppressor 60 can include a flange 80 to connect with a mating flange 82 formed on the apparatus 31. The flange 80 can include one or more apertures 84 through which mechanical fasteners such as threaded bolts or screws (not shown) can be used to attach the suppressor 60 to the apparatus 31. An alternative embodiment includes a housing 50 having the lubricant flow suppressor 60 integrally formed therewith via casting and/or a machined forging as would be known to hose skilled in the art.

The lubricant flow suppressor 60 includes a perforated wall 62 for receiving and diffusing the flow of the ejected lubricant 48. A perforated wall 64 receives the ejected lubricant 48 after the ejected lubricant has passed through perforated wall 62. Perforated wall 64 causes the lubricant to coalesce and separate from the air that has mixed therewith because of the windage effect. Perforated wall 64 can further diffuse the flow and reduce the kinetic energy remaining in the ejected lubricant 48.

Figure 7:
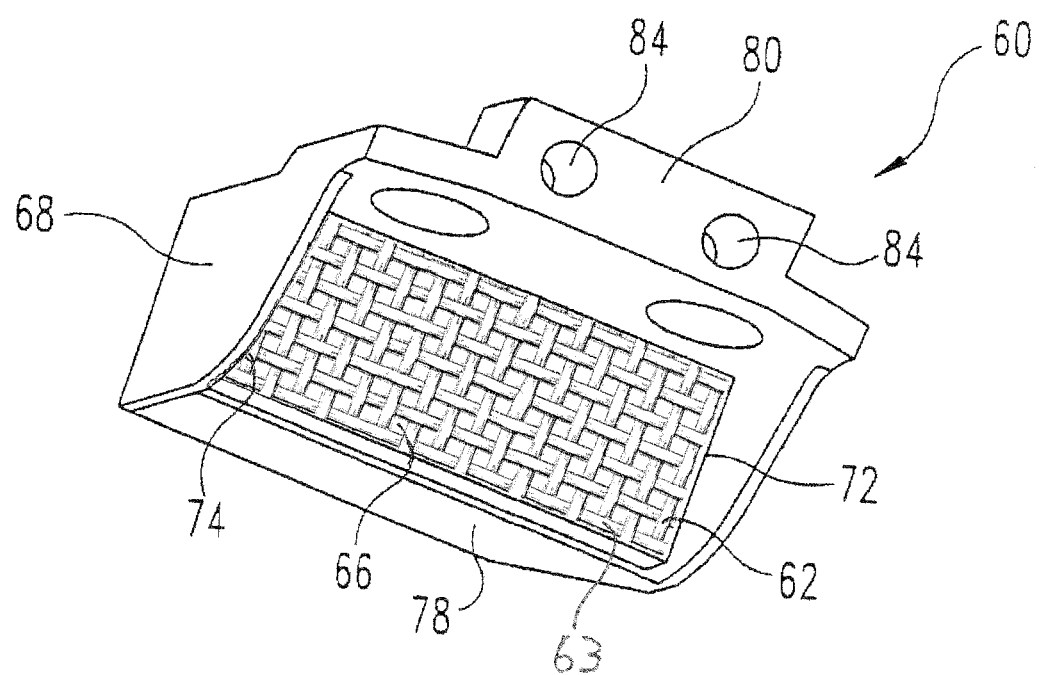
FIG. 7 illustrates some aspects of a non-limiting example of a lubricant flow suppressor in accordance with an embodiment of the present invention.
Figure 8:
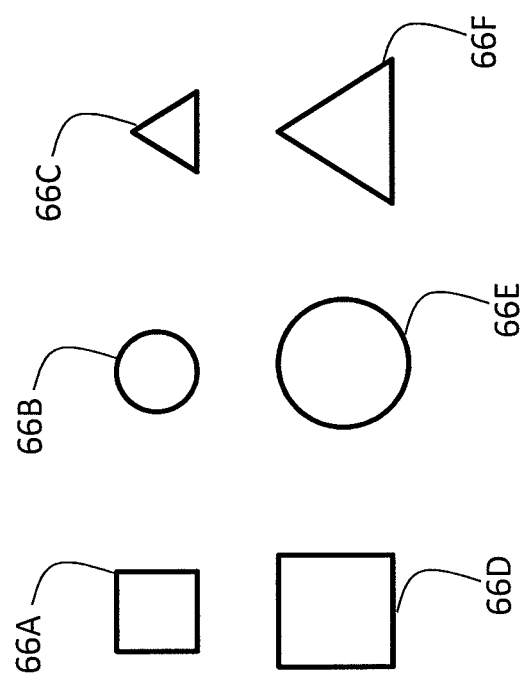
FIG. 8 illustrates some aspects of non-limiting examples of apertures of a lubricant flow suppressor in accordance with embodiments of the present invention.

Each perforated wall 62, 64 includes a plurality of apertures 66 extending therethrough. The apertures 66 can be defined by a plurality of shapes, sizes, and quantity. For example, an aperture 66 shape can be of a regular cross section such as circular, oval, square, rectangular, or triangular etc. Alternatively, the apertures 66 can be of an irregular shape. Furthermore, the size of the apertures 66 can be identical or be different from one another. A plurality of shapes and sizes are illustrated as apertures 66A, 66B, 66C, 66D, 66E and 66F in FIG. 8. However, it will be understood that the examples of FIG. 8 are non-limiting, and that in various embodiments, the apertures can be defined by a plurality of shapes, sizes, and quantity. Each perforated wall 62, 64 can also be formed to include several layers or substrates with serpentine passageways for the ejected lubricant 48 to traverse therethrough. Alternatively, the perforated walls 62, 64 can be at least partially formed of a wire mesh construction 63 (FIG. 7) with one or more layers causing the ejected lubricant 48 to follow a tortuous path to pass through one or more of the perforated walls 62, 64.

Wire mesh 63 can include interlaced wires that alternate over and under with respect to adjacent wires. The interlaced wires can be crisscrossed and extend two-dimensionally or three-dimensionally across the length of the surface of one or more walls 62 and/or 64. Alternatively a wire screen can form a portion of the perforated walls 62, 64. It should also be noted that while the drawings of the exemplary embodiment show two perforated walls 62, 64; more than two perforated walls are fully contemplated by the present invention. Furthermore, the construction and position of the perforated walls 62, 64 can be modified according to the requirements of any particular apparatus 31 as would be understood by one skilled in the art.

Lubricant flow suppressor 60 can include a sidewall 68 extending from one or both ends 72, 74 of the perforated wall 62 to define an outer perimeter 76 of the suppressor 60. The sidewall 68 can be solid or alternatively include a perforated portion similar to the first and second perforated walls 62, 64. The lubricant flow suppressor 60 can also include a bottom wall 78 connected along a portion 79 of the sidewall 68. In one form the portion 79 defines an edge. Bottom wall 78 can be substantially solid or include a perforated portion similar to the sidewall 68. In the exemplary embodiment, a top wall 80 is at least partially formed by perforated wall 64. Alternate embodiments of the present invention can define perforated wall 62 in another location with respect to the lubricant flow suppressor 60 as should be understood by those skilled in the art. It should also be understood, that all of the walls and surfaces of the lubricant flow suppressor 60 may be substantially flat or alternatively be curved or angled along at least a portion thereof. The present application fully contemplates a plurality of perforated walls.

Figure 6:
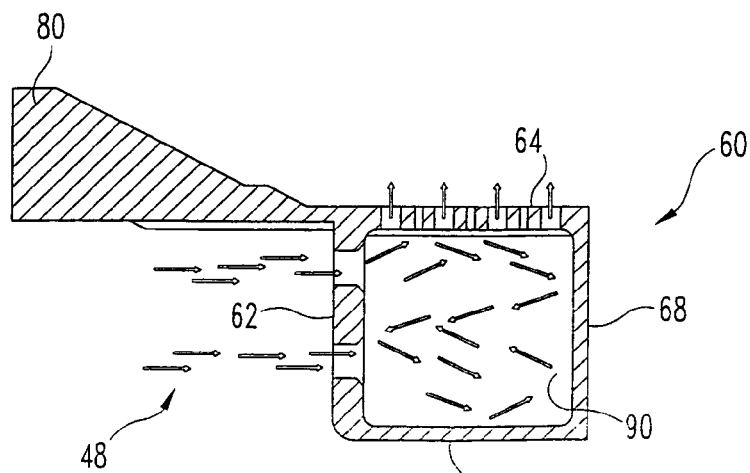
FIG. 6 is a cross-sectional view of the lubricant flow suppressor of FIG. 4.

Referring now to FIG. 6, a cross-sectional view is shown to illustrate the flow path of ejected lubricant 48 according to one embodiment of the present invention. The ejected lubricant 48 flows through perforated wall 62 causing the velocity of the lubricant to slow. After the ejected lubricant 48 passes through the perforated wall 62, the ejected lubricant 48 can then deflect off a sidewall 68 or the bottom wall 78 and at least partially fill a chamber 90 formed within the lubricant flow suppressor 60. The ejected lubricant 48 will then exit the chamber 90 through perforated wall 64, wherein the ejected lubricant 48 can drain back to one or more sump reservoirs. In one form of the invention, the ejected lubricant 48 impinges at least one solid wall prior to flowing through perforated wall 64. In another form, the ejected lubricant 48 flows through at least two perforated walls without impinging on a solid wall. In still another form, the ejected lubricant 48 flows through more than one perforated wall and impinges more than one solid wall within the lubricant flow suppressor 60.

It should be noted that the terms top wall, bottom wall, and side wall should not be read to reference a specific orientation of the suppressor 60. For example the bottom wall can be oriented in such a manner that causes it to be higher than the top wall with respect to ground or a gravitational potential energy level. Furthermore, a side wall can be oriented higher or lower than either the bottom wall or top wall at any discreet time or substantially continuously during operation of the apparatus 31. The orientation of the suppressor 60 can be generally permanent or alternatively temporary in the case of a movable platform such as an aircraft that can change attitude by pitching and rolling relative to an inertial reference frame such as the ground.

During operation of the disclosed embodiment, the ejected lubricant 48 exits through the exit port 52 (see FIG. 3) of the housing 50 and flows toward the flow suppressor 60. The ejected lubricant 48 flows through perforated wall 62 causing the velocity of the flow to decrease. The ejected lubricant can then impinge the sidewall 68 and/or the bottom wall 78 of the suppressor 60 which causes a flow direction change and further reduction of flow velocity. The ejected lubricant 48 can at least partially fill the chamber 90 of the flow suppressor 60 and exit through perforated wall 64 which de-aerates and coalesces the lubricant, and further removes energy from the lubricant flow. After traversing through the second perforated wall 64 the majority of flow energy will have been dissipated and the ejected lubricant 48 can drain to one or more sump reservoirs via gravity. In one form of the present invention the high energy of the ejected lubricant is quickly dissipated and guided to the drain sump such that the dwell time of the lubricant between ejection from the component and the drain sump is minimized.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A lubrication system comprising:
   at least one lubricant reservoir having a supply of lubricant;
   at least one pump to supply lubricant from the reservoir to a rotating component, wherein the rotating component is operative to impart momentum to the lubricant and eject airborne lubricant; and
   a lubricant flow suppressor positioned to receive airborne lubricant ejected from the rotating component, wherein the lubricant flow suppressor includes first and second perforated walls having a plurality of through apertures and arranged to receive the airborne lubricant for flow therethrough;
   at least one solid wall positioned downstream of the first perforated wall and upstream of the second perforated wall, to deflect the flow of the ejected lubricant,
   wherein the first perforated wall and the at least one solid wall form a bottom perimeter portion of a chamber, and the second perforated wall forms a top perimeter portion of the chamber.

2. The lubrication system of claim 1, wherein the first perforated wall is configured to diffuse the ejected lubricant.

3. The lubrication system of claim 1, wherein the plurality of through apertures are defined by a plurality of shapes and sizes.

4. The lubrication system of claim 1, wherein at least one of the perforated walls changes the flow direction of the lubricant ejected from the rotating component.

5. The lubrication system of claim 1, wherein the at least one solid wall is a substantially flat wall.

6. The lubrication system of claim 1, wherein the deflection is substantially normal to the lubricant flow direction.

7. The lubrication system of claim 1, wherein the second perforated wall is defined by at least one layer of wire mesh.

8. The lubrication system of claim 1, wherein the suppressor supports lubrication of a component carried by an aircraft, watercraft, land based vehicle, movable machine or stationary machine.

9. The lubrication system of claim 1, wherein the suppressor receives lubrication ejected from a gear associated with operation of a lift fan on an aircraft.

10. An apparatus comprising:
- at least one lubricant reservoir for holding a quantity of lubricant;
- at least one lubricant pump for pumping lubricant from the lubricant reservoir;
- at least one rotating component for receiving lubricant from the pump, wherein the at least one rotating component ejects airborne lubricant;
- a lubricant flow suppressor positioned proximate the rotating component, wherein the lubricant flow suppressor is configured to receive airborne lubricant that was ejected from the rotating component and to change the flow velocity of the ejected lubricant; and
- wherein the lubricant flow suppressor includes first and second perforated walls having a plurality of through apertures and arranged to receive the airborne lubricant for flow therethrough;
- at least one solid wall positioned downstream of the first perforated wall and upstream of the second perforated wall, to deflect the flow of the ejected lubricant,
- wherein the first perforated wall and the at least one solid wall form a bottom perimeter portion of a chamber, and the second perforated wall forms a top perimeter portion of the chamber.

11. The apparatus of claim 10, wherein the component includes a gear.

12. The apparatus of claim 10, wherein the suppressor is positioned within one of an aircraft, watercraft, land based vehicle, movable machine or stationary machine.

13. The apparatus of claim 11, wherein the suppressor is positioned within one of an engine, motor, turbo machine, supercharger or power transmission device.

14. The apparatus of claim 11, wherein the suppressor is positioned proximate a lubricated component associated with a lift fan for an aircraft.

15. A lubricant flow suppressor comprising:
- a first perforated wall having at least one through aperture for permitting airborne lubricant ejected from a rotating component to flow therethrough and reduce kinetic energy of the lubricant, wherein the lubricant is supplied to the rotating component from a pump; and
- a second perforated wall having at least one through aperture that permits ejected airborne lubricant that passed through the first performated wall to flow through the second performated and cause further reduction of kinetic energy of the ejected lubricant by flow therethough before the ejected lubricant traverses to a lubricant drain sump; and
- wherein the first and second perforated walls have a plurality of through apertures that are arranged to receive the airborne lubricant for flow therethrough;
- at least one solid wall positioned downstream of the first perforated wall and upstream of the second perforated wall, to deflect the flow of the ejected lubricant,
- wherein the first perforated wall and the at least one solid wall form a bottom perimeter portion of a chamber, and the second perforated wall forms a top perimeter portion of the chamber.

16. The lubricant flow suppressor of claim 15, wherein the suppressor is positioned within one of an engine, motor, turbo machine, supercharger power transmission device, aircraft, watercraft, land based vehicle, movable machine or stationary machine.

* * * * *